Feb. 28, 1961 A. D. HILL 2,973,413
COMPASS SUSPENSION FOR AUTOMATIC PILOT
Filed Nov. 13, 1959 2 Sheets-Sheet 1

INVENTOR.
ARTHUR D. HILL
BY
AGENT

Feb. 28, 1961 A. D. HILL 2,973,413
COMPASS SUSPENSION FOR AUTOMATIC PILOT
Filed Nov. 13, 1959 2 Sheets-Sheet 2
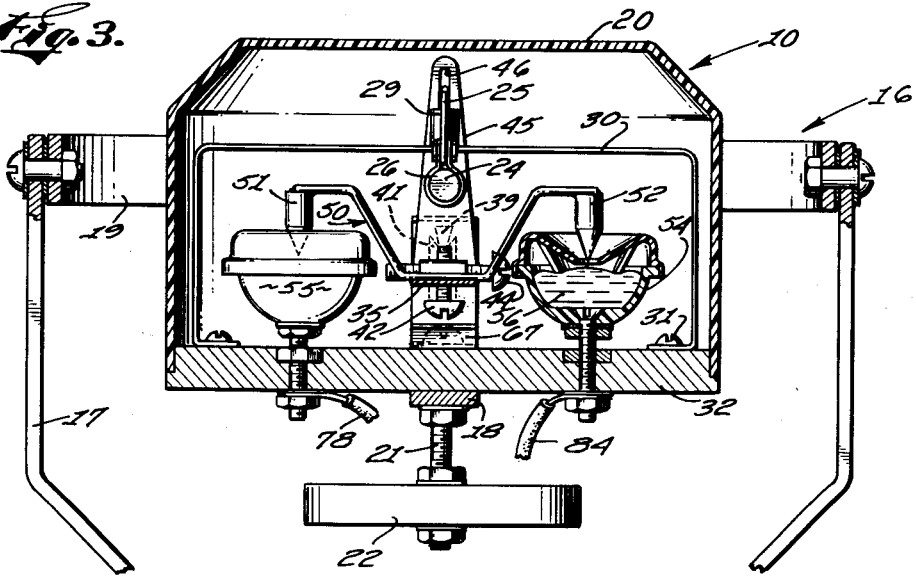
INVENTOR.
ARTHUR D. HILL
BY
AGENT

2,973,413

Patented Feb. 28, 1961

2,973,413

COMPASS SUSPENSION FOR AUTOMATIC PILOT

Arthur D. Hill, 222 20th St., Newport Beach, Calif.

Filed Nov. 13, 1959, Ser. No. 852,774

4 Claims. (Cl. 200—52)

This invention relates to a suspension for an automatic pilot, and more particularly relates to a suspension for the magnetic needle and the mobile actuated thereby of an automatic pilot of the type disclosed in my patent No. 2,864,990, issued December 12, 1958. In my said patent I have disclosed an automatic pilot having an adjustable azimuth plate on which is mounted a magnetized bar, pivoted to swing horizontally or vertically. One end of the bar is contained by a yoke which is a part of a mobile—that is to say, part of a balanced bar which swings and balances after the fashion of a mobile, and which is technically termed a gimbal bar. The gimbal bar, or mobile, is mounted on two pivots and has two other points which may alternately descend into mercury cups when the mobile swings, thereby closing and opening circuits which produce rudder control.

It will be clear that successful operation of the pilot depends in large measure upon balance, adjustment, and elimination of friction. When the pilot requires that a number of adjustments be coordinated to attain one result, it is not easy to secure a precise relationship. Also it is most desirable to prevent temporary imbalances, such as may be caused by a boat's heeling or pitching, from giving false signals. And considering that the magnetic bar is always close to the north-south magnetic line, where the magnetic field surrounding it is at its weakest—so weak as to let the bar rest—and that movement of the bar is the sole initiating impulse, it is obvious that every precaution must be taken to eliminate binding.

It is accordingly an object of this invention to provide an automatic pilot which, while operating on the same principles as were disclosed in my said Patent 2,864,-990, yet has fewer and more readily accessible adjustments.

Another object of my invention is to provide an automatic pilot having an improved gimbal bar mounting.

A further object of my invention is to provide an automatic pilot having an improved magnetic bar suspension.

Still another object of my invention is to provide means for maintaining the adjustment of the pilot, once it has been achieved, and combining in these safeguards other functions of preventing sudden dislocations.

These and other useful and novel features of my invention will be more fully disclosed as the following specification proceeds or will be apparent from consideration of the drawings in which:

Fig. 3 is a vertical sectional view at a right angle to the view of Fig. 2, and taken on the line 3—3 of Fig. 2;

Fig. 4 is a vertical sectional view through one of the gimbal bar mountings, taken on the line 4—4 of Fig. 2; and Fig. 5 is a schematic view showing the wiring between the compass and a servo motor controlling a boat's rudder.

Figure 1:
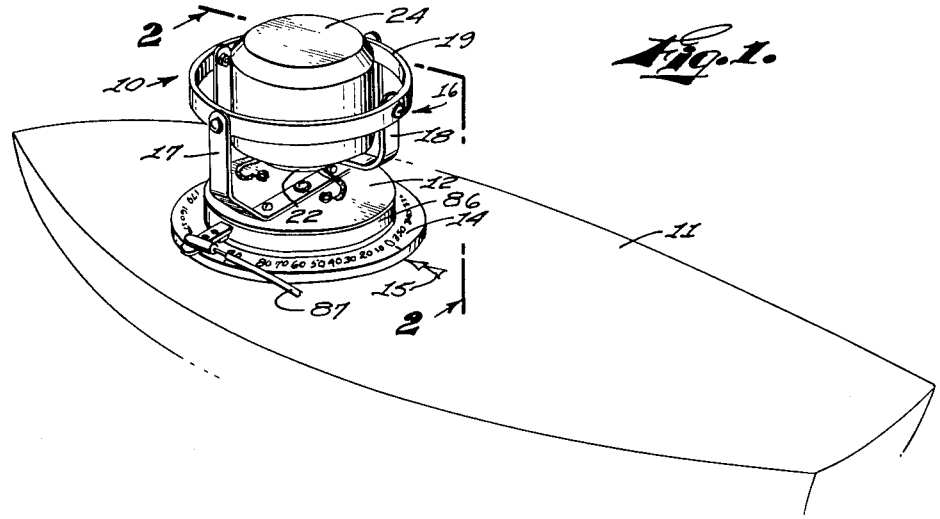
Fig. 1 is a perspective view of my improved pilot compass, the outline of a boat being included on a greatly reduced scale to indicate a zero, or straight magnetic north heading.

Having reference now to the details of the drawings, a pilot compass 10 is mounted revolvably in a boat 11 so that its base 12 which is circumscribed by an azimuth scale 14 may be revolved with reference to the lubber-line 15. Mounted on the base 12 above the azimuth card are conventional gimbals 16, comprising a lower yoke 17 fastened to the base 12, an upper yoke 18, and a gimbal ring 19 to which the two yokes 17 and 18 are swivelly connected at right angles to each other. A compass case 20 is secured to the upper yoke 18 by a bolt 21, which also supports a weight 22 for balancing the compass case. As there is no need for a helmsman to observe the compass needle, but only the setting of the azimuth when it is set from time to time, the compass case 20 may be of opaque material and may also be substantially water-tight.

Within the compass case 20 is a magnetic bar 24, the ends of which are secured to a yoke 25 by clamps 26. The yoke 25 has a centrally dependent leg 27 terminating in a pivot point 28. The point 28 is supported in a notched lug 29 on a bridge 30. The bridge 30 has its ends secured, as by screws 31, to the platform bottom 32 of the case 20. The bridge 30 is mounted on the 90°–270° axis of the azimuth card; the magnetic bar 24 will normally be held, as will presently be seen, approximately on the 0°–360° axis of the azimuth card.

Below the magnetic bar 24 and aligned therewith, there is mounted what might be called a gimbal bar but which I prefer to designate as a "mobile" 34. The mobile 34 has a central portion 35 with upwardly curved end portions 36 and 37 which terminate in downwardly hooked points 38 and 39. The points 38 and 39 are supported pivotally by posts 40 and 41. The central portion 35 of the mobile 34 hangs below the pivot points 38 and 39, and is weighted by two screws 42 and 44, one of which is adjustable vertically and the other is adjustable horizontally so that an exact balance may be obtained.

Rising from the central portion 35 of the mobile 34 is an arm 45 having a slot 46. Extending in the direction of the arm 45 from the yoke 25 is a finger 47 which passes through the slot 46 and which, as the magnetic bar 24 tends to swing, will tilt the arm 45 and thereby the whole mobile 34, from side to side. The finger 47 passes through the slot 46 at the level of the pivot point 28 supporting the magnetic bar 24, when the compass case 20 is level in its supports and the magnetic bar 24 is at rest and not bobbing.

The mobile 34 has a cross arm 50 on the ends of which are contact points 51 and 52 which dip alternately into mercury cups 54 and 55 when the mobile 34 is tilted, as by the action of the finger within the slot 46. The cups 54 and 55 each contain small amounts of mercury 56, to establish electrical contact through the hereinafter described circuits. While the contact points 51 and 52 and the slotted arm 45 have some mass above the pivot points 38 and 39, the screws 42 and 44 are below the points 38 and 39 and provide a very delicate adjustment of balance.

It is necessary, however, to adjust the height of the contact points 51 and 52 relatively to the mercury in the cups 54 and 55, the height of the mercury changing very slightly by evaporation and occasional additions. In my Patent No. 2,864,990 I disclosed a mobile supported in cups having a fixed elevation and tilting from side to side to make contact with mercury in cups which are adjustable in height. I have found it preferable to have only one adjustment left to the discretion of the helmsman, all other adjustments being made and fixed at the factory or by factory representatives. In my present improved pilot, the mercury cups 54 and 55 and the support post 41 are at fixed levels, the support post 41 being nearest the slotted arm 45 and thus maintaining more precisely the leverage afforded by the arm. The support post 40 is adjustable by means of a thumb-screw 57. The post 40 is closest to the mercury cups 54 and 55 and thereby most quickly affects the contact of the points 51 and 52 with the mercury in the cups.

The reduction in the number of adjustments has brought other problems, notably that of binding. When one of the posts 40 or 41 is adjusted and the other left fixed, it creates a very small yet important change in the distance which the points 38 and 39 must span. The upper ends of the posts 40 and 41 must contain and restrain the points 38 and 39 so that the mobile 34 can not work loose, yet they must do so with the very minimum of interference with the free swinging of the mobile. A very satisfactory solution of this problem has been achieved by making a cone-shaped depression 58 in the top of the post 40, which fixes the position of the pivot point 38 in all horizontal directions while yet permitting free pivoting; and by making a V-notch in the top of the post 41, which fixes the position of the pivot point 39 in one horizontal direction, while permitting it to slide in the notch to adjust in changes of the length of the span.

To keep the pivot points 38 and 39 from jumping vertically from the cone depression 58 and the V-notch 59, I provide guards 60 and 61. The guard 61 may be a strip of any suitable material having one end 62 caught under the hex collar 64 on the post 41 and its other end 65 bent above the upwardly curving end 37 of the mobile 34. The guard 60 may serve several purposes. Preferably it is a strip of spring material having an end 66 caught under the head of the bolt 21 and having a central portion 67 spring-biased to press down in the manner of a lock-washer upon the nut 68 on the post 40. The upper end 69 is bent to extend over the upwardly curved portion 36 of the mobile 34, but instead of being fixed as is the end 65, it may be lifted against its spring pressure to permit the pivot point 38 to be inserted in the cone-shaped depression 58. It will be seen that the guard 60 rises and falls with adjustment of the post 40, constantly bearing down on the nut 68 and constantly maintaining the same spacing above the portion 36.

Figure 2:
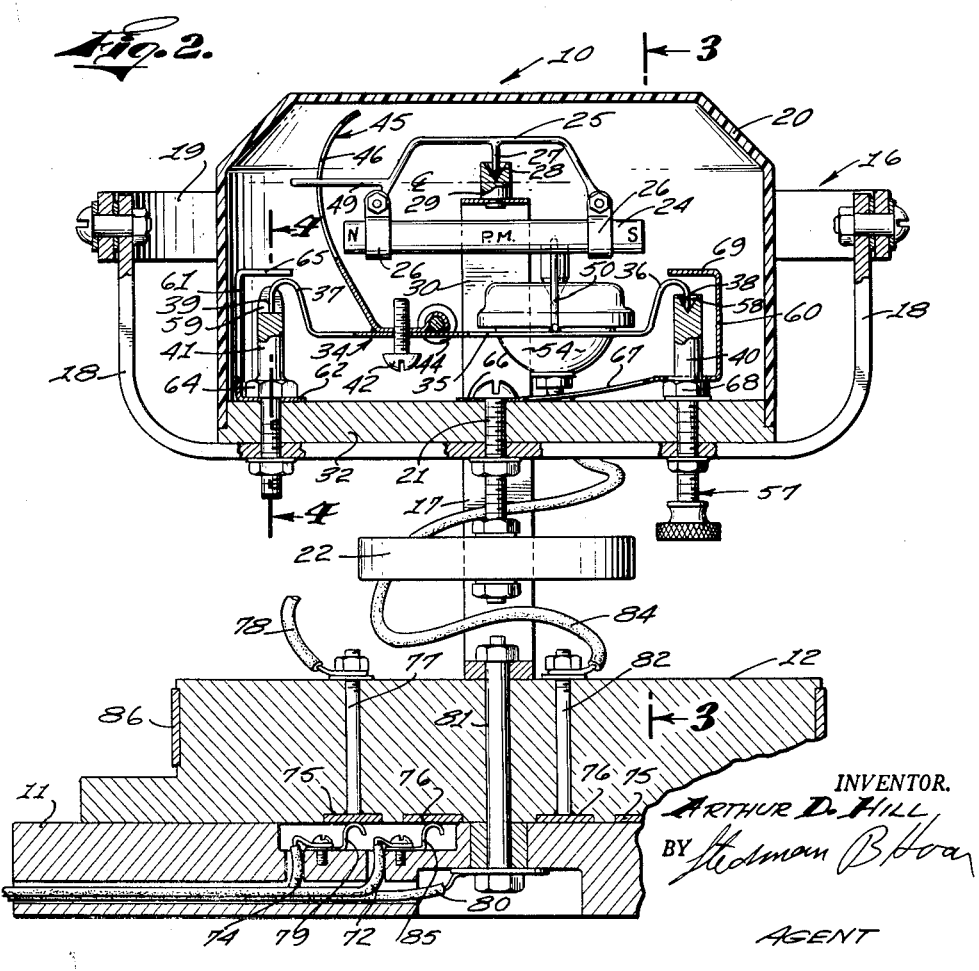
Fig. 2 is a vertical sectional view on an enlarged scale on the line 2—2 of Fig. 1.

Steering a boat by means of my improved automatic pilot is effected in general by means similar to those disclosed in my Patent No. 2,864,990. A servo-motor 70 (see Fig. 5) is connected to a source of power 71 and to reversing circuits 72 and 74. The base 12 of the compass is provided on its under side with two conductor rings 75 and 76 (see also Fig. 2). The outer ring 75 may be connected to the mercury cup 55 by a bolt 77 and wire 78 and through a sliding connection 79 to the circuit 74. The other branch 80 of the circuit, common to both the circuits 72 and 74 is through the mobile 34, post 40, guard 60, bolt 21, gimbal yokes 16 and 17, and bolt 81, on which the compass case is rotatably connected to the boat. The inner ring 76 may be likewise connected to the mercury cup 54 through a bolt 82 and wire 84, and to the circuit 72 through a sliding connection 85.

The compass is revolved on the bolt 81 to bring the desired reading on the azimuth card 14 to the lubber line 15. Then when the boat is on that heading, the magnetic bar 24 is aligned with the earth's magnetic field and the bar does not affect the arm 45 in either direction. When the mobile 34 is tilted to close the circuits 74—80 by dipping the contact point 51 in the mercury cup 55, the boat is given left rudder. When the circuits 72—80 are closed by the dipping of the contact point 52 in the mercury cup 54, the boat is given right rudder. The pilot may be compensated—that is, over-swinging of the boat may be prevented—by the friction band 86 and flexible cable 87 more fully described in my Patent 2,864,990.

By the means which I have set forth and particularly by having the finger 49 at the precise level of the pivot point 28, I have succeeded in producing a compass which practically eliminates false signals which otherwise would be caused by bobbing, swinging, and by centrifugal force. Also, the simplified adjustment, accomplished solely by the thumb-screw upon the support post, creates an instrument which is both accurate and within the adjusting capabilities of the ordinary boat-owner or deck-hand. However, this adjustment, although recognized as desirable, becomes feasible and safe only by reason of the slot and cone mountings of the pivot points 38 and 39, and by reason of the spring guard 60 which in addition to keeping the point 38 in place and serving as an electric conductor, also locks the adjustment.

The disclosed embodiment is not to be construed as a limitation upon the invention, the scope of which is deemed to include any desirable constructive modifications within the spirit and breadth of the appended claims.

I claim:

1. In a compass suspension for an automatic pilot in which electrical circuits are closed and opened to effect steering, a magnetic bar, a pivot point on which said bar is suspended for horizontal swinging motion, a finger connected to said bar and aligned therewith, said finger swinging in the horizontal plane which contains said pivot point, a gimbal bar pivoted at two points for tilting movement responsive to swinging movement of said finger, switch means on said gimbal bar for opening and closing said circuits when said gimbal bar is tilted, and means connected with one of said last-mentioned two pivot points for adjusting the height of said pivot point.

2. In a compass suspension for an automatic pilot, the structure set forth in claim 1 in which said switch means are closer to one of said two pivot points than to the other thereof, and said adjusting means adjust the height of that one of said two pivot points to which said switch means are closer.

3. In a compass suspension for an automatic pilot, the structure set forth in claim 1, said gimbal bar having two downwardly directed pointed ends, posts for pivotally receiving said ends, one of said posts having a cone-shaped depression for receiving the respective end of said gimbal bar and preventing slipping thereof, and the other of said posts having a V-shaped depression through which the other end of said gimbal bar may move.

4. In a compass suspension for an automatic pilot, the structure set forth in claim 3, inclusive of a nut on one of said posts by which the height of said post is adjustable, a spring bearing against said nut to hold said nut immobile, said spring extending above the end of said gimbal bar respective to said post to prevent the escape of said end from the depression of said post.

References Cited in the file of this patent

UNITED STATES PATENTS

| | | |
|---|---|---|
| 2,068,065 | Neubert | Jan. 19, 1937 |
| 2,524,340 | Bolin | Oct. 3, 1950 |
| 2,864,990 | Hill | Dec. 16, 1958 |